United States Patent [19]
McGarvey

[11] Patent Number: 5,404,463
[45] Date of Patent: Apr. 4, 1995

[54] METHOD AND APPARATUS FOR TRANSFERRING DATA IN PORTABLE IMAGE PROCESSING SYSTEM

[75] Inventor: James E. McGarvey, Rochester, N.Y.

[73] Assignee: Eastman Kodak Company, Rochester, N.Y.

[21] Appl. No.: 964,507

[22] Filed: Oct. 21, 1992

Related U.S. Application Data

[63] Continuation-in-part of Ser. No. 702,645, May 17, 1991, abandoned.

[51] Int. Cl.⁶ .......................................... G06F 13/38
[52] U.S. Cl. ..................... 395/325; 395/275
[58] Field of Search ............... 395/325, 250, 200, 275, 395/425

[56] References Cited

U.S. PATENT DOCUMENTS

| | | | |
|---|---|---|---|
| 4,245,301 | 1/1981 | Rokutanda et al. | 395/325 |
| 4,245,307 | 1/1981 | Kapeghian et al. | 395/325 |
| 4,539,655 | 9/1985 | Trussell et al. | 395/325 |
| 4,860,198 | 8/1989 | Takenaka | 395/325 |
| 4,967,375 | 10/1990 | Pelham et al. | 395/166 |

FOREIGN PATENT DOCUMENTS

| | | | |
|---|---|---|---|
| 0303751 | 2/1989 | European Pat. Off. | G06F 13/28 |
| 0352081 | 1/1990 | European Pat. Off. | G06F 13/42 |

OTHER PUBLICATIONS

M. Morris Mano, *Digital Logic and Computer Design*, pp. 540–551 (Prentice Hall, Inc., 1979).

*Kodak Professional DCS Digital Camera System* Sales Literature (Eastman Kodak Company, 1991).

Primary Examiner—Jack B. Harvey
Assistant Examiner—Glenn A. Auve
Attorney, Agent, or Firm—Francis H. Boos

[57] ABSTRACT

A microprocessor system, including a central processing unit (CPU), data source device and data destination device electrically interconnected by first data bus lines, address bus lines and control bus lines of a system bus, is implemented with a transfer signal control line, and second data bus lines interconnecting the data source and data destination devices for direct background transfer of data between the devices. At least one of the devices includes individually sequentially addressable storage locations, and associated address and count registers. The data source device includes "ready" and "enable output" terminals, and the data destination device includes "ready" and "enable input" terminals, all connected in AND-gate configuration so that the devices are enabled for data transfer through the second data bus lines only when both device "ready" signals and the transfer control signal are all present. A starting address is loaded in the address register and a total data unit count is loaded in the count register using the first data bus lines. The transfer control signal is then given, with the address and count registers incremented after each data unit is transferred. Once the process is started, data is transferred data unit-by-data unit and without the need for direct CPU involvement, in synchronism with the system clock, until the count register indicates completion of transfer of the entire block.

20 Claims, 4 Drawing Sheets

METHOD AND APPARATUS FOR TRANSFERRING DATA IN PORTABLE IMAGE PROCESSING SYSTEM

This is a continuation-in-part of application Ser. No. 07/702,645, filed May 17, 1991, now abandoned.

BACKGROUND OF THE INVENTION

This invention relates to a method for transferring data in a portable image processing system, and to an electrical bus structure suitable to this end.

INTRODUCTION TO THE INVENTION

As more fully described in Chapter 9 of A. J. Evans, et al., *Basic Electronics Technology* (1985 Howard W. Sams & Co.), a central processing unit (CPU), or microprocessor, is the heart of a microcomputer system functioning to perform operation control, data interpretation and instruction execution activities. The CPU comprises an arithmetic logic unit, a control unit, an input/output unit and a clock. Communication between the CPU and other support chips, such as memory and I/O units, of the computer system is performed by an internal electrical bus structure (hereafter "system bus"), with the time sequence of events in data transfer operations occurring in synchronization under control of clocking pulses in the form of a continuous square wave signal generated by the clock. The system bus conventionally comprises a plurality of (viz. 8, 16, 32, 64, etc.) single one-bit data lines known as "data bus" lines connecting respective data ports (D0–D7, etc.), a plurality of (viz. 16, 24, etc.) single one-bit address lines known as "address bus" lines connecting respective corresponding address ports, and a plurality of special function control lines (viz., read/write, I/O enable, etc.) known as "control bus" lines connecting respective control signal ports of the various system elements. Each memory unit and each I/O unit is connected to the microprocessor CPU by the system bus.

The address bus is unidirectional and is used to transmit a binary code corresponding to a unique memory location or address of an I/O device. The number of possible addresses is determined by the number of individual address bus lines. The data bus is a bidirectional bus used to transfer data in binary code to and from the CPU, and to and from other elements connected to the system bus. Although the data bus is bidirectional, data travels in only one direction at a time. The number of data lines (viz. 8, 16, 32, etc.) determines the size of the data unit (one byte, two bytes, four bytes, etc.) that can be fetched during any single fetch sequence. The number of control lines varies depending on the number of control functions required. In some systems, for example, a control line called an I/O address control line makes it possible to distinguish between addresses on the address bus corresponding to memory locations, and identical addresses on the same bus corresponding to the I/O devices. Another control line, called the read/write line, determines whether data on the data bus lines are to be read to or written from the CPU.

An electrical bus structure, such as that described, is a known and important entity that can function, for example, in a microprocessor controlled modular image processing system, as an interface between, on the one hand, a data source device such as a memory device, encryption device or transmission device, and on the other hand, a data destination device such as a memory device, compression device or display.

Figure 1:
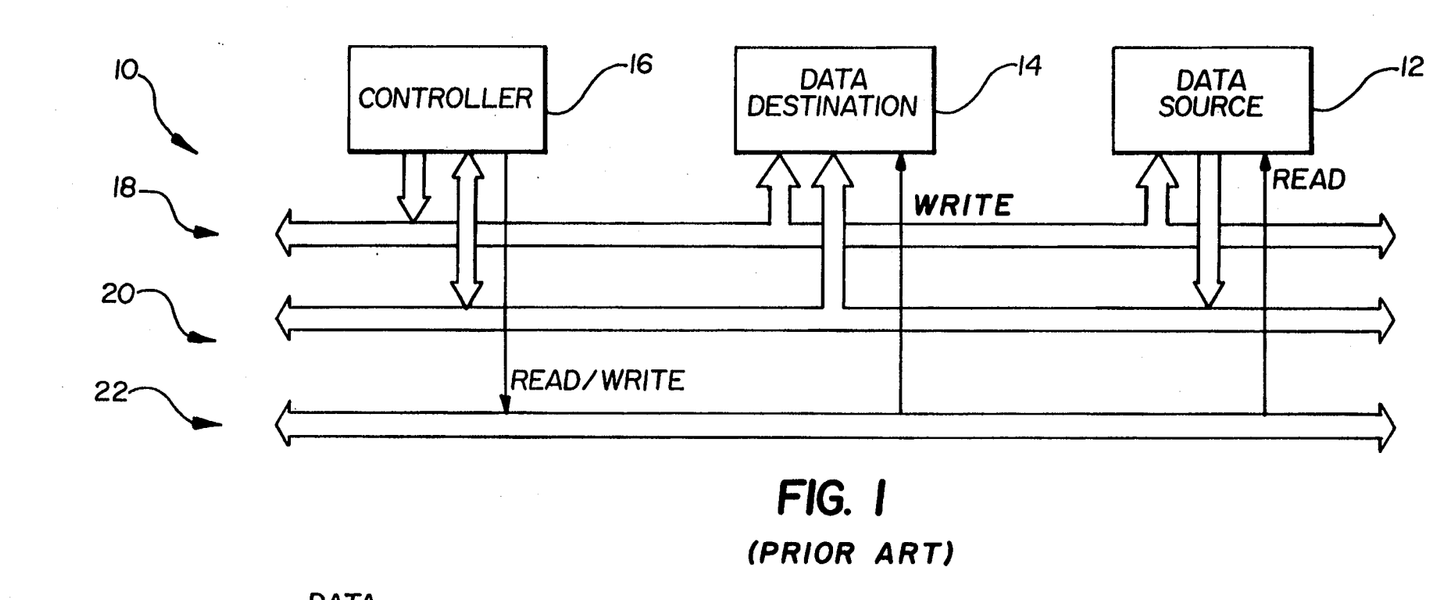
FIG. 1 (Prior Art) shows an extant electrical bus structure.

FIG. 1 shows a typical electrical bus structure 10 of the type used in such a system. The bus structure 10 can function as an interface between a data source device 12 and a data destination device 14 under control of a controller 16 in the form of a conventional central processing unit (CPU). To this end, the bus structure 10 includes address bus lines 18, data bus lines 20, and control bus lines 22. The bus structure further includes sundry interconnect lines between the three sets of bus lines 18, 20, 22, and the controller 16 and source and destination devices 12, 14, respectively.

In a typical conventional methodology for transferring data from a data source device 12 to a data destination device 14, data is transferred through CPU 16 at a rate of 8, 16, 32, etc. bits at a time (depending on the number of data bus lines 20), in a two-step process involving transfer of each data unit (i.e. byte, word, double word, etc.) from addressed locations of source device 12 into data transfer buffers of CPU 16, then back out from the buffers of CPU 16 into addressed locations of destination device 14. First, the controller 16 generates an address of a memory or other location of device 12 from which data is to be retrieved, and places it on the address bus lines 18. The device 12 is then enabled by an "Enable" control signal and a read operation is signalled by a "Read" control signal delivered on control bus lines 22. Device 12 responds by placing the thus addressed data unit on the data bus lines 20, from which it is read into controller 16. The completion of the transfer of data from device 12 to the data lines 20 is signalled by a "Ready" control signal generated by device 12. If the "Ready" signal is not given in time to complete the transfer in the same clock pulse cycle, one or more "Wait" states may be required. Second, the controller 16 generates an address of a memory or other location of device 14 to which the data is to be transferred, and places it on the address bus lines 18. The device 14 is then enabled by an "Enable" control signal, and a write operation is signalled by a "Write" control signal delivered on control lines 22. Device 14 responds by fetching the data unit from the controller 16 via the data lines 20, and writing it to the location specified by the address. Completion of the transfer of data from the data lines 20 to the device 14 is signalled by a "Ready" control signal generated by device 14. In this procedure, all data passed to or from memory or I/O ports must pass through processor 16.

Figure 2:
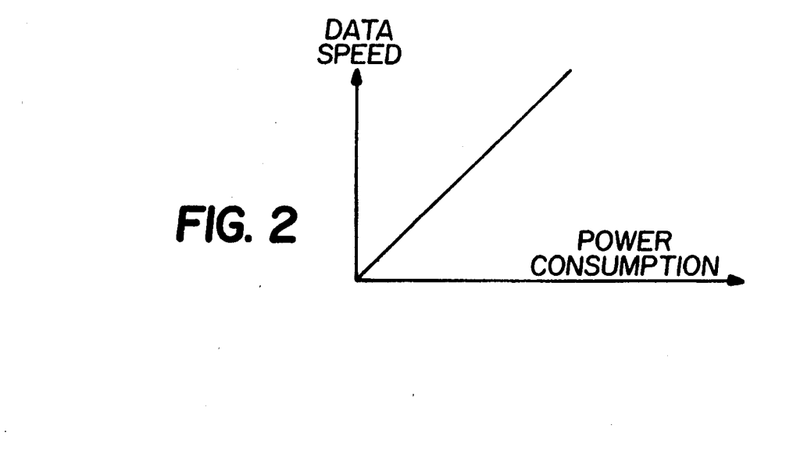
FIG. 2 shows an electrical bus structure function comprising a speed of data transmission versus power consumption curve.

The method of operation of the FIG. 1 bus structure 10 conforms, generally, to a speed transmission vs. power consumption curve shown in FIG. 2. The FIG. 2 curve suggests that the speed of data transmission is directly proportional to the power requirements of the bus structure.

Accordingly, for the FIG. 1 bus structure 10, increased speed of data transmission may be accommodated, for example, by way of adding extra data bus lines to the structure 10 (as shown), to thereby (incrementally) handle 8, 16, 32, 64 . . . bit capacities. However, this action is at the expense or trade-off of increased power consumption. On the other hand, FIG. 2 suggests that a relative reduction in the FIG. 1 bus structure power consumption requires a corresponding diminution in the speed of the data transmission. (This trade-off of speed versus power, is in part a consequence of the two-step controller addressing process, alluded to above in the methodology of the FIG. 1 bus structure.)

Heretofore, a bus structure that operates in accordance with the FIG. 2 speed/power curve, has been acceptable for use in modular image processing systems, since the data source and data destination devices typically comprise large heavy and independent units. These non-portable units can be adequately equipped with A.C. power supplies typically rated in excess of 200 watts power consumption, to thereby accommodate a satisfactory speed of data transmission.

In contrast to the modular image processing systems, and their acceptable speed/power specifications and methodologies, I am now required to design a bus structure that is suitable for use as an interface between data source and destination devices for a small, portable and integrated image processing system. The integrated system is specified to be not only small (e.g., less than 10 pounds), but have a power consumption of less that 5 watts, while retaining the data speed capabilities of at least that of the modular image processing systems.

For this situation, I have determined that the extant bus structure architectures and their methodologies, while suitable for the modular image processing systems, may not be viable for the portable integrated system. This follows since the extant bus structures and their methodologies conform to the FIG. 2 speed/power trade-offs, while the portable integrated system, in sharp contrast, must realize high speed concurrently with very low power consumption.

To speed up the data transfer process from data source 12 to data destination device 14, it is known to electronically detach the address and data buses 18, 20 from the processor 16. This procedure, known as "direct memory access" (DMA) and described in Section 12-8 of M. Mano, *Digital Logic and Computer Design* (1979, Prentice Hall), is especially useful for transferring blocks of data units to/from sequentially addressed locations of a data storage memory device, from/to an I/O port of a peripheral device. Such procedure may be invoked, for example, to periodically refresh a display screen from a memory-stored block of data corresponding to a display screen image.

During DMA, the processor is placed in an idle condition, and a DMA controller takes over the bus lines 18, 20, 22 to manage the transfer of data directly between the sequential memory locations and the peripheral. The bus is disabled or "floated" from the processor 16 by "bus request" and "bus granted" control signals. The DMA transfer can proceed one data unit at a time between microprocessor instruction executions (in a "cycle stealing" mode), or continuously for an entire block of data units (in a "whole block" mode), suspending processor operation until transfer of the entire block is completed. The DMA controller is connected in the usual way to the address, data and control lines 18, 20, 21 of bus 10, and comprises an address register, a data unit count register, a control register and address lines. The address register specifies a next memory location, and the address lines are connected for placing the address register address onto the address bus. The data unit count register specifies the number of data units in the block to be transferred.

In such an arrangement, microprocessor 16 communicates with the DMA controller registers through the data bus and control bus lines 20, 22, specifying the desired register over the address lines 18. When a "bus request" is made, processor 16 loads the DMA address register with the starting address in memory of the data unit block to be transferred, and loads the DMA data unit count register with the total number of data units in the block. Upon receipt of the "bus granted" signal, the DMA controller communicates directly with the memory by specifying the current value of its address register as an address on address bus lines 18 and activating "read" or "write" control signals in accordance with the contents of its control register. After each DMA data unit has been transferred, the DMA address register is incremented and the DMA data unit count register is decremented. Data is transferred, data unit-by-data unit in accordance with the sequential addressing until the count register is zero, signalling that the entire block has been transferred.

When this occurs, the DMA stops further transfer and "bus request" is removed. The processor 16 then reads the DMA count register to verify that the entire block has been transferred, and retakes control of the bus 10 to resume normal operations.

The conventional DMA procedure requires that the microprocessor remain idle during data transfer. This is so because addresses incremented by the DMA address register are sent on the address line, and data units sent from/to the memory to/from the peripheral are moved along the data bus.

SUMMARY OF THE INVENTION

It is an object of the present invention to provide a method and apparatus for the direct transfer of a sequentially addressed block of data from a data source device to a data destination device in a microprocessor controlled system, using an internal system bus, without the necessity to place the microprocessor in an idle state during data transfer.

It is a further object of the invention to provide a novel method for transferring data in a portable integrated image processing system, that incorporates a novel electrical bus structure to provide an interface between data source and data destination devices using such direct data block transfer.

The method and apparatus of the invention offers the advantage of facilitating the advent of portable image processing systems that can preserve all the features and capabilities of large-scale modular image processing systems, and their methodologies, including high speeds of data transmission, for example, image data transmission, while at the same time, dispensing with the heretofore seemingly dictated (FIG. 2) high power consumption supply, in favor of a portable, low power (A.C. or D.C.) supply, e.g., less than 5 watts, battery-operated supply.

In accordance with the invention, a microprocessor controlled system having a data source device and a data destination device interconnected with a microprocessor through an internal system bus is provided with a capability for direct transfer of a block of sequentially addressed data units, under microprocessor control, without the need for a separate DMA controller and without the need for disabling the bus from use by the microprocessor during such transfer.

In one aspect of the invention, a microprocessor system bus has address, data and control lines connected in conventional fashion for communication between a microprocessor, a data source device and a data destination device, at least one of the devices having a plurality of sequentially addressable data storage locations. Each storage address corresponds to the storage location of an n-bit data unit, and there is a first data bus with a first plurality of n data lines respectively connected to corresponding n data ports of the microprocessor and the source and destination devices. In departure from conventional bus arrangements, however, the system bus is provided with a second data bus having a second plurality of m data lines connecting to corresponding m other data ports of the first and second elements. The number m may be the same as, or different from the number n, and the n data ports and m other data ports may be the same, provided some means is established for isolating the first and second data bus lines from transmitting signals to each other via those ports. Also, in addition to normal control bus line interconnections, a transfer control bus is connected to receive a direct memory transfer signal from the CPU or other controller, and is connected in an AND-gate arrangement to "Ready" and "Enable" ports of the source and destination devices in interface control units furnished at such devices. An address register, data unit count register, and means for incrementing or decrementing (hereafter "incrementing") the same are provided for control of direct memory transfer addressing of the sequentially addressable data storage locations, either at one or both of the interface control units, or elsewhere in cooperative association with the second data bus and AND-gate transfer logic.

The inventive direct memory transfer process is initiated by addressing the process control registers in the usual way by the microprocessor. A sequential addressing start address is loaded into the address register and a block transfer data unit count is loaded into the count register, by data placed by the microprocessor on the first data bus lines. The transfer control bus is then set "high" to signal that address and counter register initiations are completed, and data associated with the address location whose address is indicated by the start address loaded in the address register is transferred between the source and destination devices, over the second data bus lines. The address and count registers are then incremented, with direct transfer continuing, data unit-by-data unit, according to the addresses specified in the address register, each time the "Enable" signals are given.

Because of the AND-gate connection, "Ready" signals must be present at both the data source and data destination devices before the "Enable" signal will occur. When the "Enable" occurs, both address and count registers are incremented to specify transfer of the next data unit. When the count register reaches zero, the "ready" signal is halted and an interrupt is given to the microprocessor which causes the transfer control line to go "low" and the transfer to be terminated. The devices are preferably connected via control lines to the system clock so that data is transferred synchronously with the occurrence of system clock pulses. The "Read" and "Write" control signal, otherwise required, is implied by the "high" appearing on the transfer line. For bidirectional transfer between the source and destination devices, additional control registers can be provided and provision made for storing the appropriate "Read" or "Write" signal for the duration of the transfer.

The same principles applicable when only one of the devices includes sequentially addressable storage locations, are also applicable when both devices include sequentially addressable storage locations. In such case, address and count registers can be associated with each device to set the same or different starting addresses for data retrieval from the source and data storage to the destination. Here, instead of transferring data on a sequential time-spaced basis from/to a single port address to/from a multiplicity of memory addresses, data is transferred sequentially from one multiplicity of individually addressable, separate memory locations to another. Likewise, the devices can both be ports, with address registers and counters associated with each port serving to identify sequences of externally located addresses from/to which the data should be fetched/delivered.

During the direct transfer process, the microprocessor does not have to remain idle, but can continue normal use of the first data bus lines, the address bus lines and the other control bus lines. Communications, such as instruction fetches from elements other than the source and destination devices, continue unimpeded. Communications can even occur between the microprocessor and the devices involved in the direct data transfer, with only momentary interruption of the transfer process. This occurs by the microprocessor setting the transfer control line "low," momentarily, until the direct data transfer is to be resumed.

BRIEF DESCRIPTION OF THE DRAWINGS

Embodiments of the invention have been chosen for purposes of illustration, and are described below with reference to the accompanying drawings, wherein.

Throughout the drawings, like elements are referred to by like numerals.

DETAILED DESCRIPTION OF THE INVENTION

The method and apparatus of the invention are illustrated with reference to a preferred electrical bus structure 24 shown in FIGS. 3 and 4.

The structure 24 may, for example, be implemented in an image storage unit of a high-resolution digital camera electronic photography system, such as a Kodak Professional DCS Digital Camera System, usable for the rapid capture, storage and transmission of high-resolution digital images. The DCS system includes a camera attachment, having a 1024×1280-pixel CCD full-frame imager (16×16 micrometer pixel size) that captures high quality images at exposure indexes equivalent to film speeds of ISO 200, 400, 800 and 1600 in color, or ISO 400, 800, 1600 and 3200 in black and white, and stores them in a 200-megabyte capacity Winchester hard disk of a cable-connected image storage unit. Storage is effected under microprocessor control, via the interface of an 8-megabyte dynamic random-access memory (DRAM) buffer, enabling capture of up to six images in one burst at 2.5 images per second, expandable to 24 image bursts with a 32-megabyte DRAM upgrade.

The bus 24 can be used, among other things, to move blocks of data from respective different locations of the CCD array through an I/O port to multiple, sequentially addressed memory storage locations of the buffer DRAM, or from the storage locations of the buffer DRAM through an I/O port to respective different locations of a monitor or workstation. In the former case, the block of data representing an image resides in successively accessed storage locations on the CCD array connected to a single address of an I/O port, acting as the data source device, and is transferred in serially transmitted, time-spaced data unit sequence to respectively corresponding sequentially addressed locations of the DRAM memory board, acting as the data destination device. In the latter case, the block of data representing an image resides in sequentially addressed storage locations on the DRAM memory board, acting as the data source device, and is transferred in a series of respectively corresponding time-spaced data "packets" to a single address of an I/O port, acting as the data destination device. It will be appreciated that each of these cases represents the situation wherein only one of the data devices itself has a plurality of sequentially addressed data storage locations. The other merely has one or more buffers which act as temporary storage locations for time-spaced transmittal from or to remote sequentially addressed source or destination locations of a peripheral device. The same principles are, however, applicable to the transfer of data between data source and data destination devices which both have individually, sequentially addressable storage locations on board, such as transfers from one memory device to another. The bus structure 24 can thus function as an interface between at least one data source device 26 (viz. a memory, encryption device or I/O port) and at least one data destination device 28 (viz. a compression device, memory device or I/O port).

Figure 3:
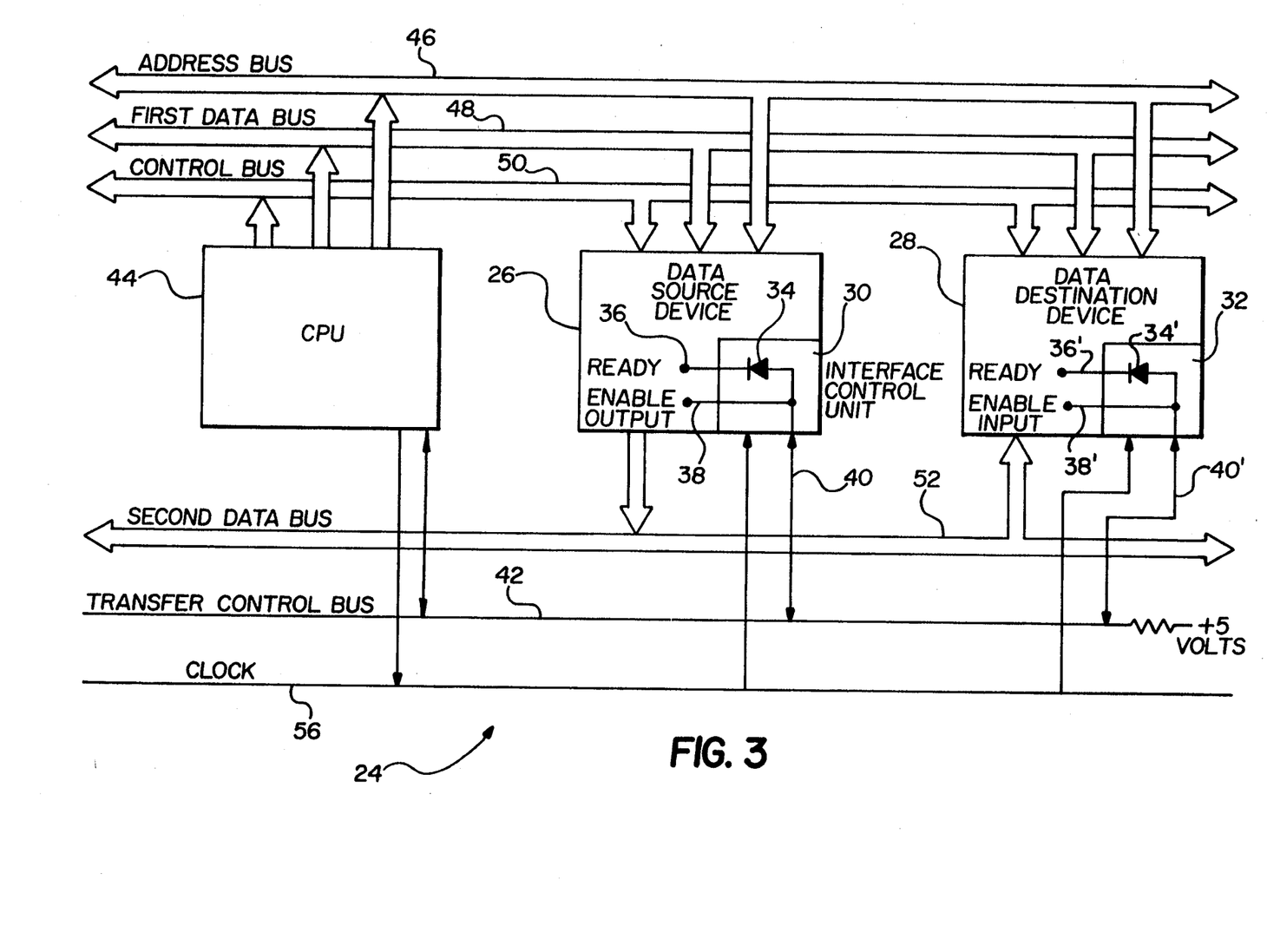
FIG. 3 shows a novel electrical bus structure in accordance with the invention suitable for use in the method of the invention.

As shown in FIG. 3, the data source device 26 and the data destination device 28 each includes an interface control unit (numerals 30, 32). The illustrative interface control unit 30 preferably includes a conventional diode circuit 34, a source "Ready" signal input control line 36 (i.e., a signal which is "True" when the data source device 26 is ready to output a signal), an "Enable Output" signal line 38 (i.e., a signal which enables the data source device 26 to output a data unit), and an interconnect line 40 to an XFER transfer signal control bus 42. The interface control unit 32 similarly includes a diode circuit 34' a destination "Ready" signal control line 36' (i.e. a signal which is "True" when the data destination device 28 is ready to receive a signal), an "Enable Input" signal line 38' (i.e. a signal which enables the data destination device 28 to input a data unit), and an interconnect line 40' to the XFER transfer signal control bus 42. The two interface control units 30, 32 act cooperatively with the transfer control bus 42, to function as a wired AND-gate.

Bus 24 connects a controller, such as a conventional central processing unit (CPU) 44, with the data source device 26 and the data destination device 28 in conventional manner by way of an address bus 46, a first data bus 48, and a control bus 50. Such connection is similar to that described previously for communication of controller 16 with devices 12 and 14 by way of address bus 18, data bus 20 and control bus 22 shown in FIG. 1. In departure from the conventional arrangement, however, bus 24 also includes a second data bus 52 connecting the data source device 26 and the data destination device 28, respectively, for direct communication under control of the transfer control bus 54. A clock pulse signal control line 56 is provided for synchronous coordination of all data flow. For the illustrated arrangement, each storage address corresponds to the storage location of an 8-bit data unit, and both first and second data buses 48, 52 have 8 lines connecting corresponding data ports of devices 26 and 28, with means provided to isolate the data lines of bus 48 from those of bus 52.

The controller 44 may be programmed so that it can dedicate low speed data transmission (hence low power consumption) in conventional manner to that part of the bus structure 24 comprising the address bus 46, the first data bus 48, and the control bus 50. Further, a low speed data unit may be processed by the controller 44 along these routes 46, 48, 50 from the data source device 26 to the data destination device 28, by the two-stage process described above for the bus structure 10 shown in FIG. 1. As noted above, the two-stage process is relatively slow, but since a low speed data unit has been assigned to this process, there is no overall loss of efficiency; at the same time, the power consumption is kept desirably low.

In accordance with the invention, however, the controller 44 may now further be programmed so that it can simultaneously perform the high speed transfer of sequentially addressed data, such as the transfer of image data between devices 26 and 28 in the background, by means of the interface control units 30, 32 and the second data bus 52. Once initial parameters are set, the transfer takes place under control of the wired AND-gate logic, with each data unit or "packet" being moved in response to a clock pulse received when all the "Ready" signal input lines are (preferably) logic "high." Since the transfer takes place, accordingly, as a one-step wired AND-gate process, the transfer of high speed data can be effected concurrently with a desirable low power consumption. The normal bus channels are not required to be yielded to the direct data transfer process, and the CPU 44 is not required to be idle.

The second data bus 52 may be used to convey image data at high speeds between the various boards of the image storage unit of the DCS system. In such case, the second data bus 52 may be considered an image bus, with each of the boards having ports ID0–ID7 connected to respective lines of the second data bus 52 and further having "Ready" and "Enable" ports connected in AND-gate fashion as previously described, for receiving the XFER signal from the transfer control bus line 42. The interface to the bus can be implemented with a bidirectional register (viz. 29FCT52). At any one time, one board can be configured as the sender or driver, with another board configured as a receiver. The bus 52 may, for example, be used to transfer a block of image pixel data stored in sequentially addressed locations of the DRAM memory buffer, one byte at a time, to the buffer of a SCSI (Small Computer Systems Interface) board for transmission to a remote destination. For such transfer, the source device 26 includes a plurality of sequentially addressable data storage locations connected to bus 24. The destination device 28, however, only has one address, i.e. the address of the SCSI port.

To implement automatic addressing during transfer of the data block, a plurality of control registers are associated with the device 24, 26 that has the sequentially addressed plurality of storage locations. As shown in FIG. 4, besides the diode circuitry 34 comprising transfer logic 31, control unit 30 can be accommodated to further comprise an address control register 64, a count control register 65, a data buffer register 66 and, optionally, a read/write (R/W) control register 67. Address register 64 has 8 data input ports connected at 68 to respective ones of the 8 data bit lines of the first data bus 48, for receiving and storing a start address which corresponds to the start address of the plurality of sequentially addressed data unit storage locations of data source device 26 from which the block will be read. The count register 65 includes 8 data input ports connected at 69 to respective ones of the 8 data bit lines of the first data bus 48, for receiving and storing the number N of bytes stored in the sequence of addresses in the block to be transferred. Both address register 64 and count register 65 are connected to increment logic circuitry 70 to be incremented, as discussed below, during the byte-by-byte transfer of data between the device 26 and device 28. The data transfer register 66 has 8 data ports connected at 72 to the 8 lines of the second data bus 52 for transfer to the bus 52 of the 8 bits of the source device 26 appearing at the location whose address is then located in the address register 64, when the data transfer register 66 is enabled via the transfer logic 31.

As shown in Table 1, below, the transfer logic 31 (viz., the diode circuit 34, 34' AND-gate connection) functions so that data output from device 26 and data input to device 28 will be enabled only when source "Ready," destination "Ready," and transfer control XFER signals are all present. The clock connections 40, 40' add the additional requirement that data transfer will only be effected when the clock pulse signal is also present.

TABLE 1

Transfer Control Logic Truth Table

Figure 4:
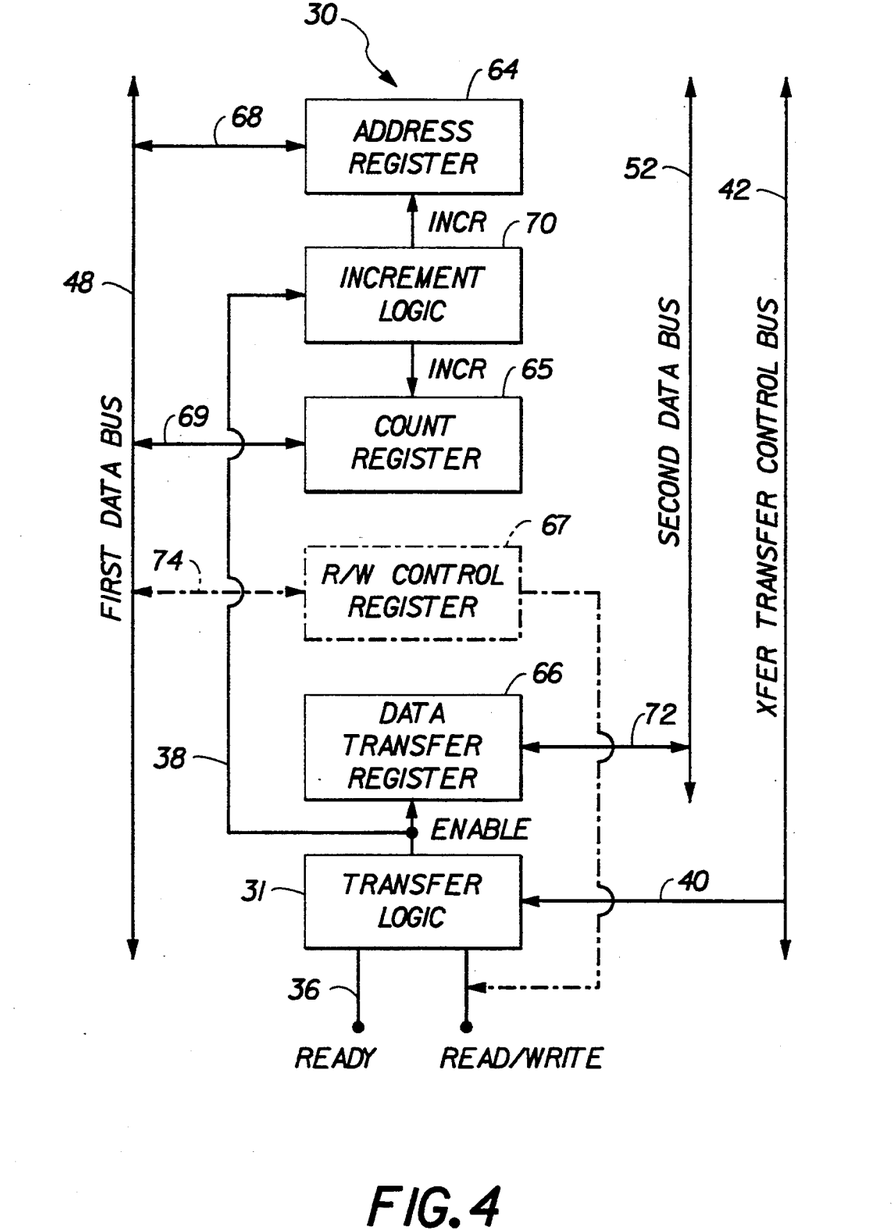
FIG. 4 shows a block diagram of control registers and related circuitry employed with the bus of FIG. 3.

| TRANSFER CONTROL | SOURCE READY | DEST. READY | SOURCE OUTPUT ENABLE | DEST. INPUT ENABLE |
|---|---|---|---|---|
| 0 | 0 | 0 | 0 | 0 |
| 0 | 0 | 1 | 0 | 0 |
| 0 | 1 | 0 | 0 | 0 |
| 0 | 1 | 1 | 0 | 0 |
| 1 | 0 | 0 | 0 | 0 |
| 1 | 0 | 1 | 0 | 0 |
| 1 | 1 | 0 | 0 | 0 |
| 1 | 1 | 1 | 1 | 1 |

Where destination device 28 is itself a memory or other device having its own plurality of sequentially addressable storage locations to be individually addressed, and into which the data arriving from source device 24 is to be separately written, interface control unit 32 is also provided with control registers and circuitry, like that shown in FIG. 4 for unit 30.

For cases in which device 26 will always function as a source device, and device 28 will always function as a destination device, the read/write control can be fixed in the hard wired design of the respective devices. When this is not the case, however, means are provided to enable the roles of source or destination to be reversed. Toward that end, an R/W control register 67 is optionally provided with a connection 74 to the first data bus 48 to receive the "Read" or "Write" signal for application during the direct memory transfer process. In the illustrated embodiment, the "Write" signal will be latched into register 67 of device 26, with the "Read" signal latched into register 67 of device 28, if present.

Figure 5:
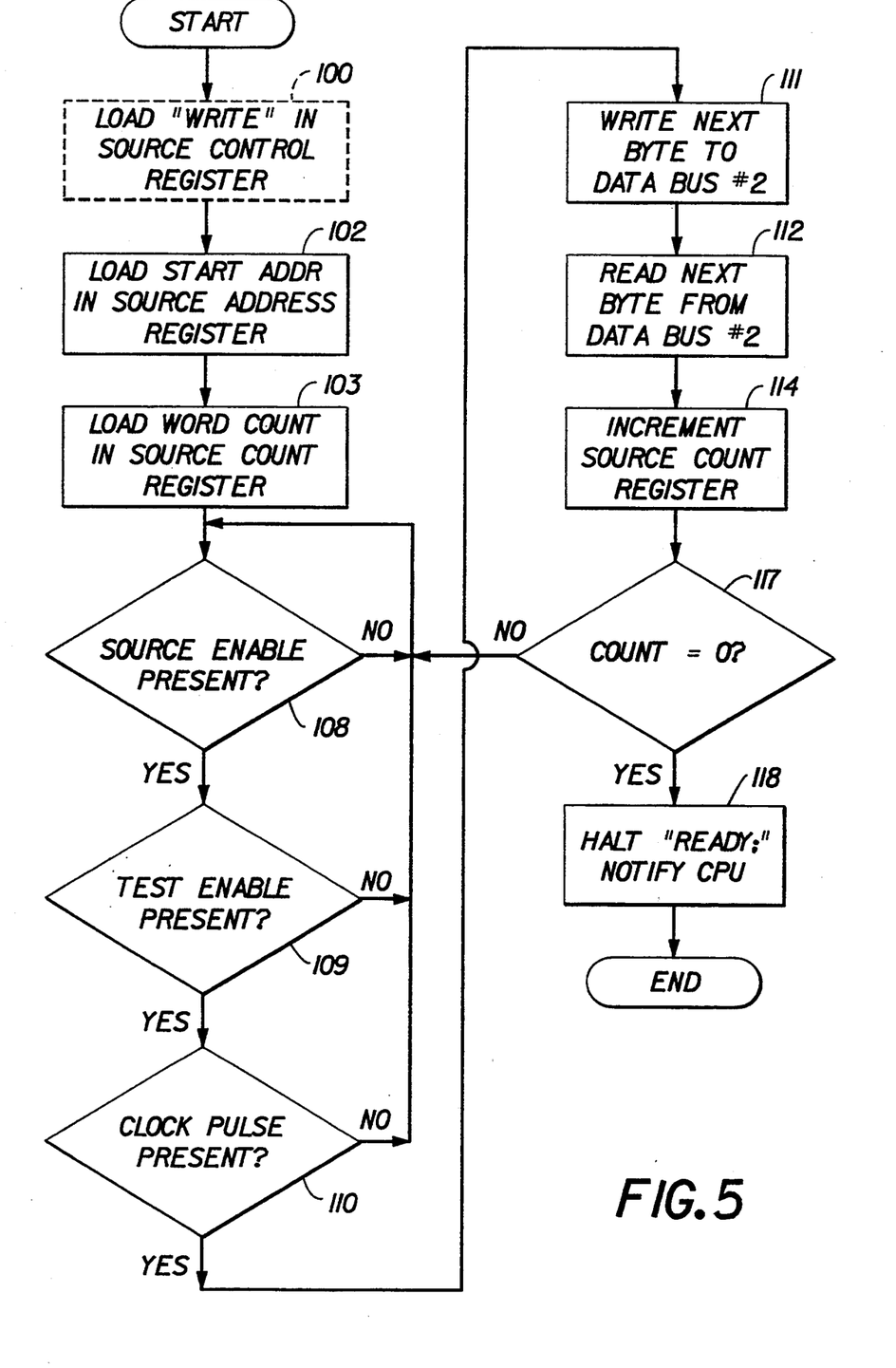
FIG. 5 shows a flowchart helpful in understanding the operation of the structure of FIGS. 3 and 4.

The operation of the process of direct data transfer between devices 26, 28, can be understood with reference to the flow diagram shown in FIG. 5. With reference to FIG. 5, the direct memory transfer process is initiated by setting the address, count and control registers 64, 65, 67 of the device 26 (and also of device 28, if applicable), using the conventional features of the bus 24, i.e., the respective lines of the address bus 46, first data bus 48 and control bus 50. As indicated, the CPU 44 places the address of R/W control register 67 on address bus 46, and places the data corresponding to the "Write" signal on the first data bus 48. The "Read" and "Enable" signals are then passed to the interface control unit 30, and the data unit corresponding to the "Write" signal is latched into control register 67. This is shown by optional block 100 in the flow diagram. In a similar manner, as shown at 102, 103, the CPU successively addresses first the address register 64, and then the count register 65, and loads corresponding data via the first data bus 48 into each of those registers. The starting address location of the block of data to be transferred from sequentially addressed locations in device 26 is latched into register 64; and the total count of the locations to be sequentially addressed is latched into count register 65. (If applicable, CPU 44 uses the same conventional process to load data corresponding to the "Read" control signal, starting destination address, and total data unit count respectively into the corresponding registers 67, 64 and 65 of interface control unit 32 of destination device 28.)

Once the data for process initiation has been loaded, CPU 44 sets the transfer control bus 42 "high" so that direct transfer of the sequentially addressed data can occur between devices 26 and 28. The AND-gate arrangement of diode circuits 34, 34' functions so that output of the contents of the storage location whose address is present in register 64 of device 26 is enabled only when the transfer control bus is "high," and the "Ready" signal appears at both devices 26 and 28. Likewise, the input of data from the second data bus 52 (to the I/O port address or location address then stored in register 64 of destination device 28) will only be enabled when the transfer control bus is "high" and the "Ready" signal appears at both devices 26 and 28. For synchronous transfer, the clock pulse must also be present on clock control line 56. With the "Source Enable" present, the "Destination Enable" present, and the clock pulse present, the next byte of data will be written from device 26 to the second data bus 52, and that byte will be read from the second data bus to the destination device 28, all in a one-step process. This is indicated at 108, 109, 110, 111, 112 in FIG. 5. The increment logic 70 (FIG. 4) then acts to increment the address register 64 and the count register 65 in the interface control unit 30 (and also in 32, if applicable), as indicated at 114. Then, unless the count in count register 65 is zero at 117, the read/write process is repeated for the next data byte appearing in the source location identified by the next address appearing in address register 64, after incrementation.

The count register 65 initially contains the total number of data units (i.e. bytes) to be transferred, so incrementation to zero indicates that transfer is complete. This cancels the "Ready" signal of the associated device 26 (and 28, if applicable), thereby disabling both "Enable Output" and "Enable Input" signals 38, 38'. CPU 44 is then notified at 118 that the block transfer is complete. Because the block of data is transferred from sequentially addressed locations, incrementing the address in register 64, causes the CPU-unattended successive addressing to shift from one location to the next, through the sequence of data units addresses in the block.

As already indicated, while the train of data is being transferred in the background from device 26 to device 28, bus lines 46, 48, 50 are available to the CPU for other traditional uses. The CPU can also be programmed to periodically monitor the success of the direct data transfer. For example, the CPU can momentarily interrupt the XFER signal on the transfer control bus to halt the transfer, while the contents of the address and count registers 64, 65 are examined. The transfer can also be halted in response to interrupt signals of various types received from devices 26, 28 or elsewhere, if necessary.

As already mentioned, the method and apparatus of the present invention are suitable for direct transfer of data where one or both of the devices 26, 28 is a single address I/O port, acting as a conduit to a sequentially addressable multiple storage location element, but is not itself a sequentially addressable multiple storage location element. In such case, an alternative mechanism for locally initializing and incrementing addressing of a remote sequentially addressed target or source may suffice, using the same AND-gate logic to enable the transfer only when the XFER signal and both device "Ready" signals are present. The driven data does not require addressing by register 64, 65 at the receiver, but need only be valid following clock cycles when the XFER condition is "true." When receiving, the data transfer register 66 of the receiver will latch the bus data after a "true" XFER cycle.

The transfer line 42 controls the transfer of data over the image data bus. The XFER signal may be driven by any board currently participating in an image data transfer (sender, receiver or master). It can be driven by a fast, open drain (or open collector) driver (viz. 74FCT244). As indicated in FIG. 3, line 42 may be pulled up on a master board by a 150 Ohm resistor to 5 volts. Line 42 and the image data bus 52 are preferably set to always operate synchronously with the system clock via the clock lines 56. If XFER is "high" ("true") at a rising clock edge, then the sending board 26 can be set to drive the image data bus 52 with a valid data byte prior to the next rising edge, and the receiving board 28 can be set to capture that byte at that edge. Any board which is unable to send or receive at the next clock edge will then pull XFER "low" prior to the preceding edge. Thus, when XFER remains "high," data is transferred on every rising clock edge and the data rate is equal to the clock frequency. Registers such as those shown at FIG. 4, located at either device 26, 28 or elsewhere, act to contain a transfer counter 65 which may be used by firmware to limit the number of bytes transferred. This counter can be programmed to pull XFER "low" after a specified count, if desired. The clock line 42 provides the system clock to all boards. This line is driven by CPU 44 and typically carries a 12 megahertz symmetrical clock signal. The clock is present whenever back plane 5-volt power is on.

In the described example, using the bus 42 to transfer a block of image data between a memory board 26 of the image storage unit to a SCSI device connected to the unit via a SCSI controller board 28, the master board CPU 44 serves to initialize the SCSI controller configuration to receive the data from the image data bus 52. As stated, the CPU 44 loads the starting address of the image block into the memory board address register 65 and configures the memory board to send to the image data bus 42. If desired, either the count register 65 or a separate data transfer counter can be set up in CPU 44 to monitor the progress of the transfer directly. In such case, the CPU 44 transfer counter is loaded with the number of bytes to be transferred, before CPU 44 enables the pullup on the XFER line 42. When the memory board 26 is ready to send the first byte, it will then release the XFER line. When the SCSI board 28 is ready to receive the first byte, it will also release the XFER line 42. After both boards have released the XFER line, control line 42 will go "true," signalling the boards to transfer a byte of data on the following rising clock edge. The SCSI board 28 will likely release XFER for only one cycle at a time, as it accepts data into its transmit register on a first-in first-out (FIFO) basis. The memory board 26 will pull the XFER line "low" when it needs extra time to change the DRAM row address. Thus, the transfer will proceed at the highest rate that both boards can sustain, up to 12M bytes per second.

The CPU 44 on the master board will continue to use the control bus 50 to monitor and control other devices, and may stop the transfer in progress if a higher priority need for the image bus arises. When the required number of bytes has been transferred, the master board counter will pull the XFER line 42 "low," stopping the operation. The computer will then disable the sending and receiving boards, freeing the image bus 52 for other operations.

Those skilled in the art to which the invention relates will appreciate that other substitutions and modifications can be made to the described embodiment without departing from the spirit and scope of the invention as described by the claims below.

What is claimed is:

1. In a microprocessor system comprising a central processing unit (CPU), a memory and another device; the memory having a plurality of individually addressable data unit storage locations and the other device having at least one individually addressable data unit storage location; and the CPU, memory and other device being respectively electrically interconnected by a system bus, including a first set of data bus lines, a set of address bus lines and a set of control lines, so that a data unit can be transferred between the memory and the other device under control of the CPU in a process in which the data unit is read from a first addressed one of the storage locations of the memory or other device in accordance with a first address placed on the address bus lines, and then written to a second addressed one of the storage locations of the other device or memory in accordance with a second address placed on the address bus lines; the improvement comprising:

the system bus further including a second set of data lines interconnecting the memory and the other device;

an address register connected to the first set of data lines for receiving and storing a starting address of sequentially addressable ones of the memory storage locations, and coupled to the memory for specifying the address of a given memory storage location to be in data transfer communication with the second set of data bus lines;

a count register connected to the first set of data lines for receiving and storing a number corresponding to a total number of data units in a block of data units to be transferred between the sequentially addressable ones of the memory storage locations and the other device at least one storage location;

first "ready" signal means for signalling a first "ready" signal when the memory is ready to participate in a transfer of a data unit between the given memory storage location whose address is loaded in the address register and the second set of data bus lines;

second "ready" signal means for signalling a second "ready" signal when the other device is ready to participate in a transfer of a data unit between the second set of data bus lines and the other device at least one storage location;

transfer control signal means, connected to the CPU, for signalling a transfer control signal;

enabling signal means, connecting the transfer control signal means and the first and second ready signal means, for enabling the memory and other device for participating with the second set of data lines in the transfer of a data unit, when the transfer control signal, the first "ready" signal and the second "ready" signal are all present; and means connected to the address and count registers for respectively incrementing the address and count stored in those registers in response to transfer of a data unit between the memory and other device over the second set of data lines; and means, connected to the CPU, for signalling when the count register has been incremented by a number of times corresponding to the total number of data units to be transferred;

whereby a block of data units can be transferred between the sequentially addressable ones of the memory storage locations and the other device at least one storage location through the second set of data lines, data unit-by-data unit, under control of the enabling signal means.

2. An improvement as in claim 1, wherein the enabling signal means comprises a hard-wired AND-gate connection between the transfer control signal means, the first "ready" signal means, and the second "ready" signal means.

3. An improvement as in claim 2, wherein the transfer control signal means comprises a transfer control signal line; wherein the first "ready" signal means comprises the memory having a first "ready" signal terminal; the second "ready" signal means comprises the other device having a second "ready" signal terminal; and wherein the AND-gate connection comprises the memory having a first "enable" signal terminal connected to the transfer control signal line, the other device having a second "enable" signal terminal connected to the transfer control signal line, a first diode connected between the first "ready" signal terminal and the first "enable" signal terminal, and a second diode connected between the second "ready" signal terminal and the second "enable" signal terminal.

4. An improvement as in claim 1, wherein the other device is an input/output port circuit.

5. An improvement as in claim 1, wherein the other device is another memory; the other device at least one storage location is another plurality of individually addressable data unit storage locations; and the system further comprises another address register connected to the first set of data lines for receiving and storing another starting address of sequentially addressable ones of the other memory storage locations, and coupled to the other memory for specifying the address of a given memory storage location to be in data transfer communication with the second set of data bus lines; and means connected to the other address register for incrementing the address stored in the other address register in response to transfer of a data unit between the memory and other device over the second set of data lines.

6. An improvement as in claim 1, wherein the microprocessor system further comprises a system clock; and wherein the enabling signal means further comprises means for enabling the memory and other device in synchronism with the system clock.

7. A microprocessor system suitable for the transfer of a block of image data units, comprising:

a central processing unit (CPU);
a data source device;
a data destination device;
at least one of the data source and data destination devices including a plurality of individually addressable data unit storage locations;

a system bus, including a first set of data bus lines, a set of address bus lines, a set of control bus lines, electrically interconnecting the CPU, data source device and data destination device; a second set of data bus lines interconnecting the data source and data destination devices; and a transfer control signal line;

an address register connected to the first set of data lines for receiving a starting address of sequentially addressable ones of the plurality of storage locations, and connected to specify a given one of the sequentially addressable ones of the storage location to be in data transfer communication with the second set of data bus lines;

first "ready" signal means coupled to the data source device for signalling when the data source device is ready to transfer data to the second set of data bus lines;

second "ready" signal means associated with the data destination device for signalling when the data destination device is ready to transfer data from the second set of data bus lines;

means for delivering a transfer control signal to the transfer control signal line from the CPU;

enabling means, connecting the transfer control signal line to the first and second "ready" signal means, for enabling the data source device to transfer a data unit to the data destination device through the second set of data bus lines in response to the simultaneous occurrence of the first "ready" signal, the second "ready" signal and the transfer control signal;

means connected to the address register for incrementing the address stored in that register in response to transfer of a data unit from the data source to the data destination device; and means for signalling when all data units in the block have been transferred.

8. A microprocessor system an in claim 7, wherein the means for signalling when all data units in the block have been transferred comprises a count register connected to the first set of data bus lines for receiving and storing a number corresponding to a total number of data units in the block of data units to be transferred; means connected to the count register for incrementing the number stored in the count register in response to transfer of a data unit from the data source to the data destination device; and means, connected to the CPU, for signalling when the count register has been incremented by a number of times corresponding to the total number of data units to be transferred.

9. A system as in claim 7, wherein the data source device comprises a random access memory.

10. A system as in claim 9, wherein the data destination device comprises a small computer system interface (SCSI) input/output port circuit.

11. A system as in claim 7, further comprising a system clock; and wherein the enabling means further comprises means for enabling the transfer of data in synchronism with the system clock.

12. A system as in claim 7, wherein the enabling means comprises a hard-wired AND-gate connection between the transfer control signal line, the first "ready" signal means, and the second "ready" signal means.

13. A system as in claim 12, wherein the first "ready" signal means comprises the data source device having a first "ready" signal terminal; the second "ready" signal means comprises the data destination device having a second "ready" signal terminal; and wherein the AND-gate connection comprises the source device having a first "enable" signal terminal connected to the transfer control signal line, the data destination device having a second "enable" signal terminal connected to the transfer control signal line, a first diode connected between the first "ready" signal terminal and the first "enable" signal terminal, and a second diode connected between the second "ready" signal terminal and the second "enable" signal terminal.

14. In a microprocessor system comprising a central processing unit (CPU), a memory and another device; the memory having a plurality of individually addressable data unit storage locations and the other device having at least one individually addressable data unit storage location; and the CPU, memory and other device being respectively electrically interconnected by a system bus, including a first set of data bus lines, a set of address bus lines and a set of control lines, so that a data unit can be transferred between the memory and the other device under control of the CPU in a process in which the data unit is read from a first addressed one of the storage locations of the memory or other device in accordance with a first address placed on the address bus lines, and then written to a second addressed one of the storage locations of the other device or memory in accordance with a second address placed on the address bus lines; the method of transferring a block of data units between sequentially addressed ones of the memory storage locations and the other device at least one storage location, the method comprising the steps of:
providing a second set of data bus lines connecting the memory and the other device;
using the first set of data bus lines, loading a starting address of the sequentially addressed ones of the memory storage locations into an address register;
using the first set of data bus lines, loading a number corresponding to a total number of data units in the block into a count register;
signalling a transfer control signal when the starting address and total number count have been loaded;
signalling a first "ready" signal when the memory is ready to participate in a data unit transfer;
signalling a second "ready" signal when the other device is ready to participate in a data unit transfer;
in response to the simultaneous presence of all of the transfer control signal, first "ready" signal and second "ready" signal, enabling the transfer of a data unit between the memory storage location whose address is present in the address register and the at least one storage location, through the second set of data bus lines;
incrementing the contents of the address and count registers; and
repeating the enabling and incrementing steps until the contents of the count register indicates that the total number of data units in the block has been transferred.

15. A method as in claim 14, wherein the enabling step occurs in synchronism with timing pulses of a system clock.

16. The method as in claim 14, wherein the other device is another memory; the other device at least one storage location is another plurality of individually addressable data unit storage locations; the method further comprises the step of using the first set of data bus lines, loading another starting address of sequentially addressable ones of the other memory storage locations into another address register; the enabling step comprises transferring the data unit between the memory storage location whose address is present in the address register and the other memory storage location whose address is present in the other address register; and the incrementing step further comprises also incrementing the contents of the other address register.

17. A method for transferring a block of image data units, between a data source device and a data destination device of a microprocessor system, at least one of the data source and data destination devices including a plurality of individually addressable data unit storage locations; the system including a central processing unit (CPU), and a system bus having a first set of data bus lines, a set of address bus lines and a set of control bus lines electrically interconnecting the CPU, data source device and data destination device; and the data source device and data destination device each including a "ready" terminal for indicating a data transfer "ready" status; the method comprising:
providing a second set of data bus lines electrically connecting the data source and data destination devices; and a transfer control signal line for signalling a transfer control signal;
providing the data source device with an "enable output" terminal for receiving an "enable" signal to enable data transfer from the data source device to the second set of data bus lines; and the data destination device with an "enable input" terminal for receiving an "enable" signal to enable data transfer from the second set of data bus lines to the data destination device; and
connecting the "ready," "enable output" and "enable input" terminals in an AND-gate arrangement to the transfer control line, so that the "enable" signals will be given only when "ready" signals are present at both "ready" terminals and the transfer control signal is present at the transfer control line.

18. A method as in claim 17, further comprising the steps of loading a starting address of sequentially addressable ones of the plurality of storage locations into an address register; signalling a transfer control signal on the transfer control line; and incrementing the contents of the address register after each occurrence of the "enable" signals.

19. A method as in claim 18, further comprising the steps of loading a number corresponding to a total number of data units in the block into a count register; incrementing the contents of the count register after each occurrence of the "enable" signals.

20. A method as in claim 19, wherein the system has a system clock and data units are transferred in synchronism with the system clock.

* * * * *